United States Patent [19]

Krichevsky

[11] 4,100,520

[45] Jul. 11, 1978

[54] DEVICES FOR CONTROLLING A.C. MOTORS

[75] Inventor: Mendel Krichevsky, Beer-Sheva, Israel

[73] Assignee: Ben-Gurion University of the Negev Research and Development Authority, Beer-Sheva, Israel

[21] Appl. No.: 595,726

[22] Filed: Jul. 22, 1975

[30] Foreign Application Priority Data

Jul. 28, 1974 [IL] Israel .......................... 45360
Jul. 7, 1975 [IL] Israel .......................... 47648

[51] Int. Cl.$^2$ .................... H01F 21/02; H01F 17/06
[52] U.S. Cl. .................... 336/30; 336/135; 336/136; 336/178; 336/233
[58] Field of Search ........... 336/130, 90, 171, 115, 336/121, 83, 30, 136, 135, 178, 233, 234, 134

[56] References Cited

U.S. PATENT DOCUMENTS

| | | | |
|---|---|---|---|
| 2,594,567 | 4/1952 | Landon | 336/121 |
| 3,182,301 | 5/1965 | Kolb | 336/130 |
| 3,358,256 | 12/1967 | Naito et al. | 336/83 |
| 3,394,363 | 7/1968 | Norman | 336/130 |
| 3,488,647 | 1/1970 | Stuckert | 336/130 |
| 3,507,039 | 4/1970 | Craige | 336/83 X |
| 3,551,864 | 12/1970 | Sweeney et al. | 336/83 |
| 3,610,029 | 10/1971 | Carlson | 336/130 |
| 3,668,585 | 6/1972 | Johnson | 336/83 |
| 3,882,436 | 5/1975 | Chass | 336/130 |
| 3,891,918 | 6/1975 | Ellis | 336/130 |
| 3,961,243 | 6/1976 | Schulz | 336/130 |

*Primary Examiner*—Thomas J. Kozma
*Attorney, Agent, or Firm*—Browdy & Neimark

[57] ABSTRACT

A device for controlling an A.C. motor having an electromagnetic field inducing coil wound around a conductive element having at least one inwardly directed opening bound by surface areas thereof and having a gap a between the surface areas defined by the formula $a \geq \delta$, wherein $\delta$ is the wave penetrating depth of an instantaneous operating frequency of the induced electromagnetic energy, the coil being wound so as to surround the open space and the element.

23 Claims, 16 Drawing Figures

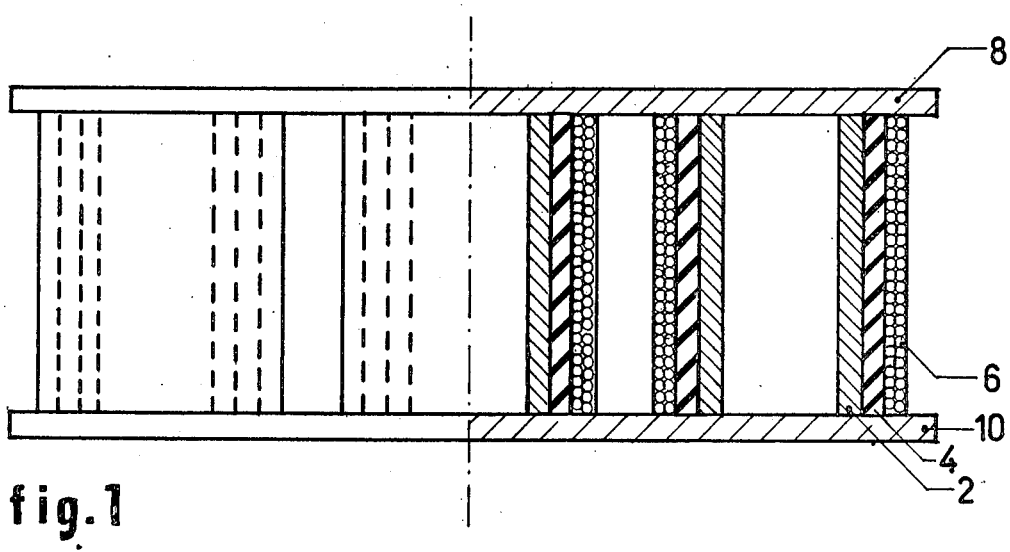
fig.1
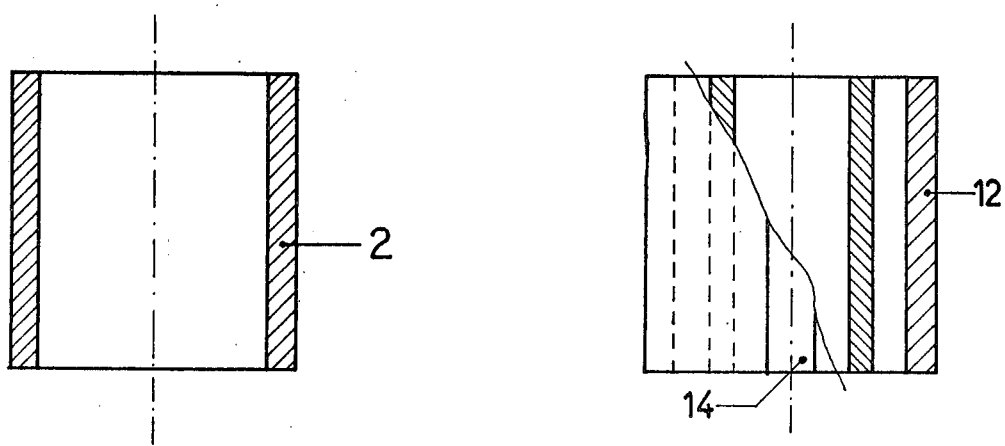
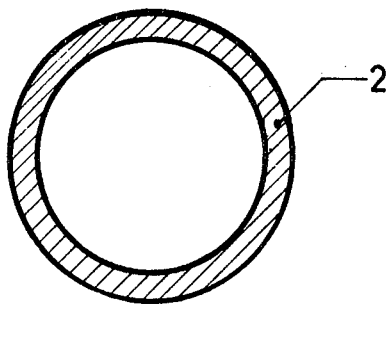
fig.2
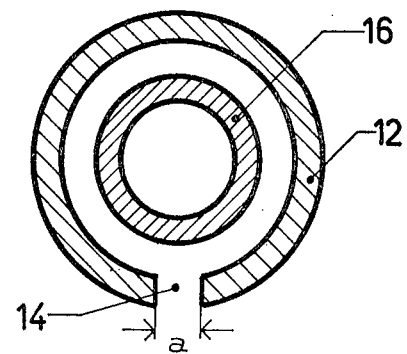
fig.3

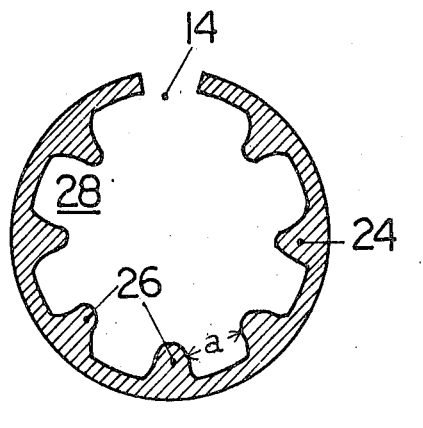
fig. 10
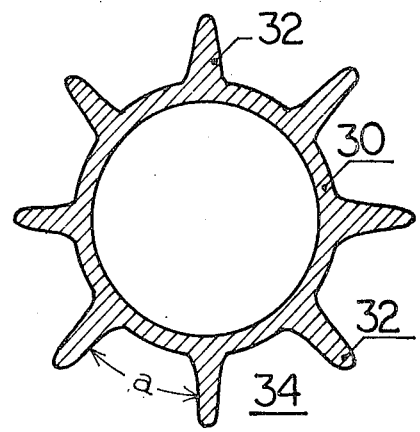
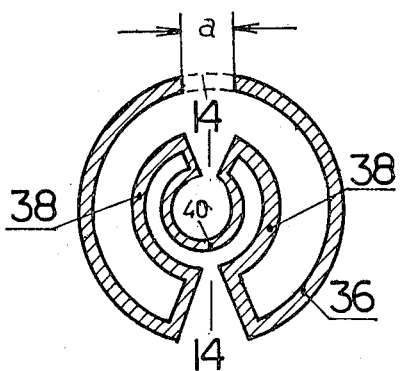
fig. 12
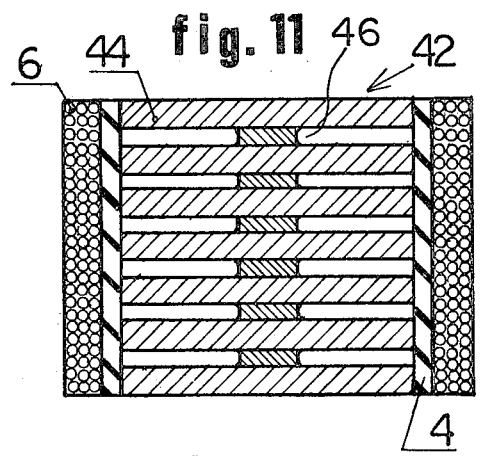
fig. 13
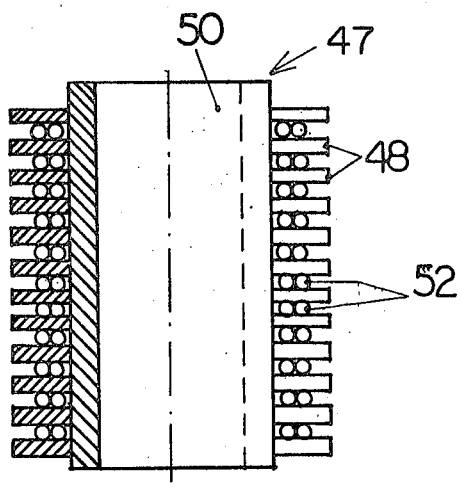
fig. 14

DEVICES FOR CONTROLLING A.C. MOTORS

Field of Invention

The present invention relates to devices for controlling A.C. motors having a wound coil on a core. More particularly, the present invention relates to devices for controlling A.C. motors utilizing energy losses and turbulent electrical currents and their dependency on frequency, having an electromagnetic field-inducing coil wound around a conductive shaped element or around an assembly of a plurality of element bodies.

Background of the Invention

It is known that during the starting period of a motor, the variation of the current and electromagnetic torque depend on the motor's parameters while being independent of the load torque. As high starting current has adverse effects on the motor and on its load, it is desired to limit, as far as possible, the starting current of the motor, without affecting its torque-speed curve.

Therefore, in order to obtain the desired torque-speed curve with a relatively low starting current, variable resistances are coupled to the motor to serve as external impedances of the rotor. The instantaneous overall impedance is manually or automatically regulated during the starting period of the motor by means of a control unit composed of resistors, and a plurality of contacts. However, this method for achieving the desired low starting current has many disadvantages: the resulting torque-speed is not smooth but rather increases in a step-like fashion; the multiplicity of elements such as contacts resistors etc. in the control unit greatly detract from the unit's workable safety and reliability; and finally the necessity of such a multi-element control unit makes the device cumbersome and costly to build and maintain.

Summary of the Invention

It is therefor suggested to utilize the energy losses and the turbulent currents induced in core elements as an external impedance in the rotor by capitalizing on the fact that energy losses in motors are dependent on frequency of operation and on the magnetic induction.

In known motor starting devices, for a given iron core element, the ratio of the active to the reactive power $k = P/Q$, is frequency dependent $[P = F(f), Q = F(f)]$, and can not be changed. Thus the range of use of such devices is very limited.

The broad object of this invention is therefore, to provide a device for controlling a wound-rotor motor having a core element which overcomes the above mentioned disadvantages and in which the ratio of the active to the reactive power $k = P/Q$, and their frequency dependency, can be controlled. Furthermore it is also an object of the invention to provide a device for the above described purpose having improved heat-exchange characteristics and a smaller size.

Description of Preferred Embodiments

In accordance with the above objects, there is provided a device for controlling an A.C. motor having an electromagnetic field inducing coil wound around a conductive element wherein said element comprises at least one inwardly directed opening bound by surface area of said element and having a gap $a$ between said surface areas defined by the formula $a > \delta$, wherein $\delta$ is the wave-penetrating depth of an instantaneous operating frequency of the induced electro-magnetic energy, said gap defining an open space within the confines of said element and further characterized in that said coil is wound so as to surround said open space and said element, whereby the exposed surface area of said element is increased for magnifying the absorption of the induced energy.

A preferred embodiment of the present invention is a device wherein said element is a substantially hollow tubular element having at least one throughgoing slot extending along at least a portion of the surface of said element.

Yet another preferred embodiment of the present invention is a device wherein said tubular element is provided on its inner or outer surfaces with at least one inwardly or outwardly extending projection to further increase the surface area thereof.

It will be realized that the core element can in fact be assembled or composed of a plurality of element bodies and that a multitude of variations in the element's configurations will be possible within the framework of the present invention as described hereinafter.

The simple yet effective device described herein can also be provided with one or more additional internal coaxial inserts, and similarly to said coil-wound element, additional element or elements each having at least one opening or a throughgoing slot, can also be provided.

Experiments carried out with motors having power outputs of 200kw and of 1000 kw, respectively, have shown that a motor-starting device constructed in accordance with the invention can be made in a size which is 3.5 to 4 times smaller than a similar device of the known type, i.e. a device with a core element which is not provided with openings on its surface area.

The reason for this size reduction feature of such a device is believed to be due to the increased surface area which is exposed for the absorption of energy. The opening or openings in the element allows the induced electromagnetic waves to energize a greater surface area of said element. At the same time the openings provide additional heat-exchange contact areas through which the generated heat can be dissipated by aeration.

While the invention will now be described in connection with certain preferred embodiments, it will be understood that it is not intended to limit the invention to these particular embodiments. On the contrary, it is intended to cover all alternatives, modifications and equivalent arrangements as may be included within the scope of the invention, as defined by the appended claims. Nevertheless, it is believed that the embodiments of the invention will be more fully understood from a consideration of the following illustrative description read in conjunction with the accompanying drawings, in which:

Brief Description of the Drawings

FIG. 1 is a cross-sectional view of the construction of a known three-phase device for starting a motor;

FIG. 2 shows longitudinal and transverse cross-sectional views of the shape of the cores of the known device shown in FIG. 1;

FIG. 3 shows longitudinal and transverse cross-sectional views of a core in accordance with one embodiment of the invention;

FIG. 10 is a cross-sectional view of a different embodiment of the device of FIG. 3;

FIG. 11 is a cross-sectional view of still a different embodiment of a device according to the present invention;

FIG. 12 is a cross-sectional view of concentrically disposed inter-connected slotted tubular elements;

FIG. 13 is a longitudinal cross-sectional view of a core element composed of interconnected spaced-apart plate-members;

FIG. 14 is a longitudinal cross-sectional view of a finned core element;

Description of the Preferred Embodiments

Figure 7:
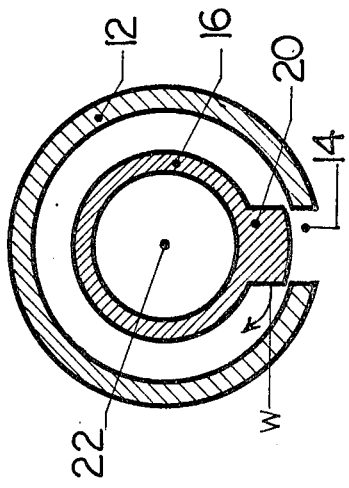
FIGS. 5 to 7 are cross-sectional views of tubular elements having slots of different shapes.

Referring first to FIGS. 1 and 2 in which the constructional details of a known motor-starting device is shown, it can be seen that essentially such a device consists of a tubular core element 2 fitted on its outer surface with an insulating spacer 4 on which a coil 6 is wound. For a three phase motor, three of such assemblies are coupled together by means of ferromagnetic plates 8 and 10.

This known device works as follows: Upon the starting of the motor the frequency of the voltage applied to the rotor is stepwisely varied from 50Hz to 2-3Hz. This variation will cause a stepwise change in the penetrating depth of the electromagnetic wave in the core and in turn results in a corresponding stepwise starting of the motor.

The device according to one of the most simple and readily understood embodiments of the present invention is shown in FIG. 3. It consists of a tubular core element 12 in which there is provided a throughgoing longitudinal slot 14 along its entire length. The width $a$ of the slot and its shape need not be constant along the entire length of the slot but could be varied, as will be explained hereinafter. The basic requirement, however, of the width $a$ of said slot for allowing electromagnetic waves to pass therethrough is that $a > \delta$ and preferably $> 2\delta$ where $\delta$ is the wave of penetrating depth of the electromagnetic energy. Optionally, the core element 12 may be provided with one or more additional tubular core elements 16, made with or without slots. Also, it should be realized that each of said core elements could have more than one slot and that each of the slots could be shaped differently.

The influence of the shape of a slot on the starting process will now be described in connection to FIGS. 4 to 7.

Using Maxwell's equations while simplifying by approximation, it can be shown that the penetrating depth $\delta$ of a plane electromagnetic wave is totally absorbed in a depth $\delta = \geq$ from the outer surface of the conductive region. This can be formulated by the expression $$\delta = \frac{\lambda}{\pi}$$

where $\delta$ is the wavelength.

Figure 4:
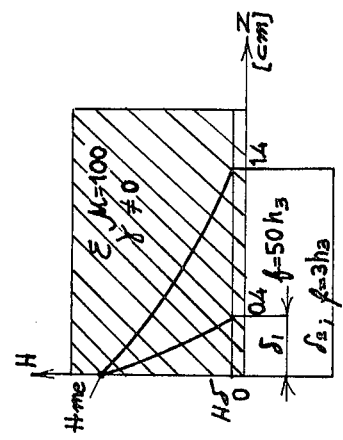
FIG. 4 is a diagram showing the penetration of an electromagnetic wave in an iron body, at two frequencies.

For example, as shown in FIG. 4, in the operating frequency of 50 Hz, the maximum penetrating depth of a plane electromagnetic wave, having a magnetic field intensity Hme in an iron body, is 0.45 cm while at the operating frequency of 2-3 Hz the penetrating depth is 1.4 cm.

Figure 6:
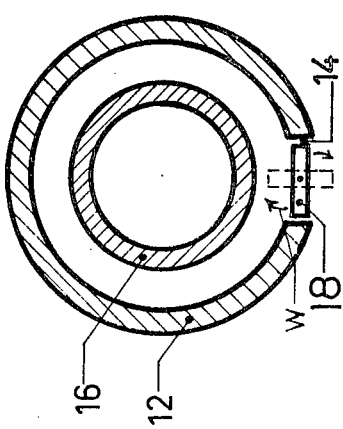
Figure 5:
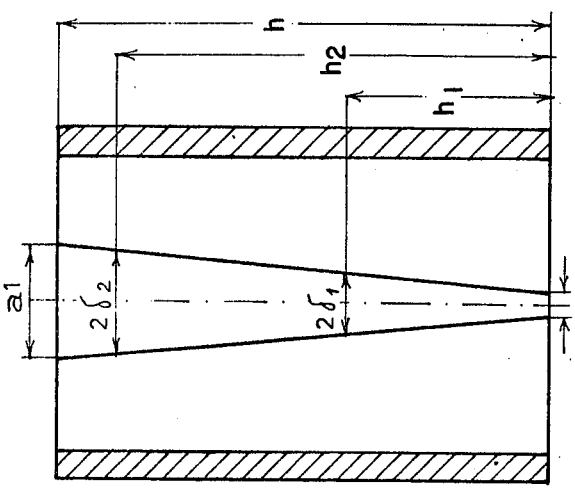

With reference, now, to FIGS. 5 to 7 the following three general cases may prevail in a slotted iron tubular element for a given frequency:

1. When the slot's width $a \geq 2\delta$ Fe, then the electromagnetic wave enters the slot and is absorbed by the inner surface of tubular element 12; wherein an additional inner core 16 exists, said electromagnetic wave is also absorbed by its outer surface (see FIG. 6);

2. When the width of the slot $\delta < a < 2\delta$ Fe, the electromagnetic wave only partly enters said slot; and 3. When the width of the slot $a < \delta$ Fe, it is assumed that the electromagnetic wave does not enter the slot.

In this latter case, the effect of the slot is merely to increase the length of the path for the Foucault currents which in turn, increases the inductive part in the impedance of the tubular element.

The variation in the slot's width $a$ along its length, for example, a slot having a general trapezoidal shape as in FIGS. 5 and 6 or a wedge shape as in FIG. 7, could be analyzed in accordance with the above described three general cases. The tubular element can be considered to be an assembly of superposed annuluses each having the height of one winding of a coil. Thus, the sections of a tubular element having, e.g., a variable width slot where the width of the slot $a > 2\delta$ will allow an incoming electromagnetic wave to enter said slot.

With respect to the FIGS. 4 to 7 considering now the frequency of 50 Hz; in this particular frequency $2\delta = 2\delta_1$ and thus, in the sections of the slots $h-h_1$ where $a > 2\delta_1$, the electromagnetic wave will enter the slots, while in the sections $h_1$ where the slot's width $a < 2\delta_1$, the wave will not enter.

Upon starting the motor, the frequency decreases from said 50 Hz when the motor speed $n=0$, to 2-3 Hz and $2\delta = 2\delta_2$ when the motor reaches the nominal speed $n=n_1$. Hence while the starting speed and frequency change, the length of the slot's sections through which a wave can enter simultaneously change from $(h-h_1)$ to $(h-h_2)$, where the ratio $h_1/h_2$ depends on the shape of the slot. Therefore, the amount of energy which enters into the slot, or conversely, the amount of energy which is absorbed by the tubular element depends also on the shape of the slot. It is thus clear that changes introduced in the shape of a slot i.e., in the width $a$ of said slot, facilitate the controlling of the device in the various frequencies, by the controlling of the ratio P/Q namely, the ratio between the active to reactive power of the device.

Figure 8:
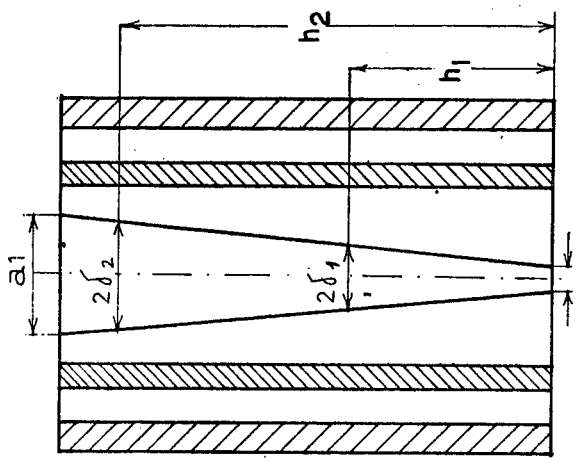
FIG. 8 is a top sectional view of the device of FIG. 3 having means for regulating the effective size of a slot.

In order to widen the range of the effective control during the operation of such devices beyond the predetermined range prescribed by the particular shape of the slot, it is suggested to provide means for varying the size of the opening of the slot during said operation. One possible embodiment of such a device is shown in FIG. 8.

As seen, a plate 18 of any shape is pivotally situated in the slot 14 and adapted to act as a rotatable valve, as indicated by arrow W, in order to control the size of a slot's opening. This dynamic arrangement is characterized by its relatively high operating speed, thus providing a fast-reacting and sensitive means for controlling the amount of electromagnetic energy which is desired to enter tubular element 12, at any particular instant during e.g., the starting operation of a motor.

Figure 9:
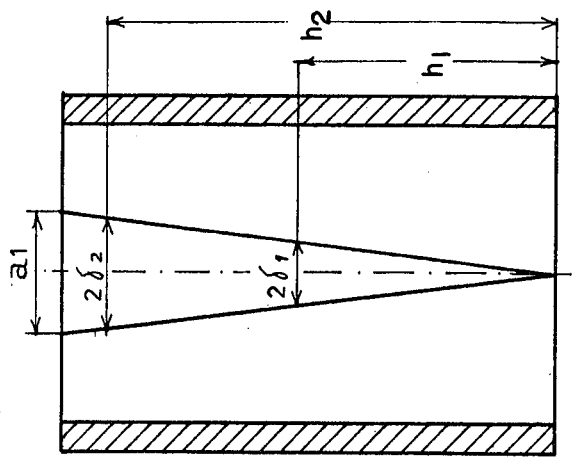
FIG. 9 is a top sectional view of the device of FIG. 3 with different means for regulating the effective size of a slot.

Still a different construction for a dynamic control of the size and shape of a slot is illustrated in FIG. 9. According to this embodiment, the interior core element 16 is provided with a tongue 20 along at least part of its exterior length, which tongue projects across the space between the core element 16 and the slotted tubular element 12. The core element 16 is adapted to rotate about its axis 22 as indicated by arrow W, causing by its rotation the displacement of the tongue 20 from behind slot 14, thus allowing the controlled entrance of electromagnetic waves for the energization of the interior surfaces of the device.

While heretofore there have been shown and discussed only slotted tubular core elements, the present invention also provides many other possible shapes and configurations of such core elements, all of which shapes and configurations are intended to increase the surface area of the element which is exposed to the induced electromagnetic field.

For example as seen in FIG. 10 a tubular element 24 having a slot 14 may be furnished on its inner surface with a plurality of inwardly extending projections 26 which projections define openings 28 having a gap $a$ therebetween to allow the electromagnetic wave to enter therein.

Another embodiment is shown in FIG. 11. The shown tubular element 30 is provided with projections 32 extending from the outer surface of said tubular element to define openings 34 of a width $a$ therebetween.

FIG. 12 illustrates an element 36 which is designed so as to utilize the interior thereof for providing additional surface area which is adapted to be exposed to an induced field. As seen, the element 36 comprises two concentrically disposed substantially tubular elements 38 and 40 interconnected along their slotted openings 14 to form labyrinth like passages therein. The interior space of the element 36 is thus filled with additional surface area which can be reached by the induced electromagnetic waves.

It is understood that any other shape or configuration of any element other then a cylindrical element, could just as well be designed to form a maze-like interior and thus also provide the discovered advantages achieved by building core elements having a maximized surface area per fixed volume.

Turning now to FIG. 13, there is shown an element 42 which consists of a plurality of interconnected spaced-apart conductive plate-members 44. The plate members define suitable openings 46 therebetween, which openings having a width $a$, are exposed to the field induced by the coil 6. The element 42 may have any desired shape or configuration, produced from one piece or assembled from individual members.

In FIG. 14 there is shown a finned slotted tubular element 47 having a plurality of spaced-apart fins 48 mounted on a body 50. According to this embodiment the coil 52 is wound on the body 50 in the opening between adjacent fins 48 so as to surround only a portion of the surface area of said fins and thus leave the extreme edges of the fins free.

Figure 15:
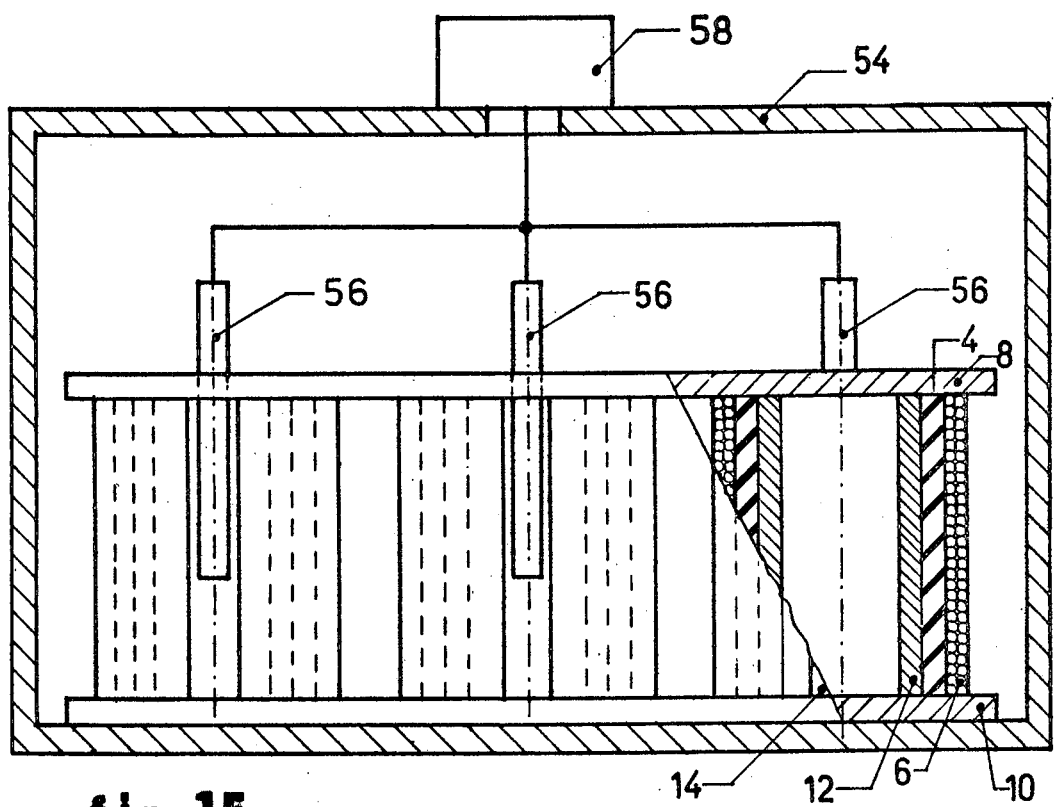
FIG. 15 illustrates partly in cross-section a device having means for regulating the effective size of a slot.

In FIG. 15 there is shown a further way by which dynamic regulation of the amount of absorption of energy by an at least partly hollow slotted body is achieved.

While in the different embodiments described hereinbefore the amount of energy absorbed by the device is mainly controlled by the shape and size of the openings, according to this embodiment the energy is also regulated by means of the interior core element or elements.

As mentioned above, the interior of a slotted tubular element 12, such as shown in FIG. 3, could be provided for example with several similarly slotted tubular elements, each one of which slots would be individually shaped and controlled by the following described dynamic means.

The dynamic control consists of the assembly for starting a three-phase motor shown in FIG. 15 housed inside an enclosure 54. In addition, each tubular element 12 is made with a slot 14 and is provided with a metal plate 56 of a shape substantially identical to the shape of the slot. The plates 56 are adapted to be reciprocally displaced in the slots along their main axis by means of an electromagnetic drive means 58.

On the basis of the preceding explanation, it is clear that any part of the element openings which is blocked by the plates 56 does not allow the entrance of an incoming electromagnetic wave. Thus, the amount of energy absorbed by the device is controlled by the instantaneous size of the opening in the slot and consequently, the speed of the inductive motor is correspondingly influenced. The reciprocating plates provide, therefore, additional means, beside the predetermined shapes of the openings and the instantaneous operating frequencies, by which the starting operation of a motor can by dynamically controlled.

It is understood that the openings and plates need not necessarily be of the same shape and that various obvious variations are possible. Also the speed in which those plates are adapted to reciprocate in the slots could be adjusted to provide the desired sensitivity in the controlling procedure.

Moreover, the described reciprocating action of the plates, could automatically be governed by obtaining a feedback signal from the motor and applying it to the electromagnetic drive means 58.

Figure 16:
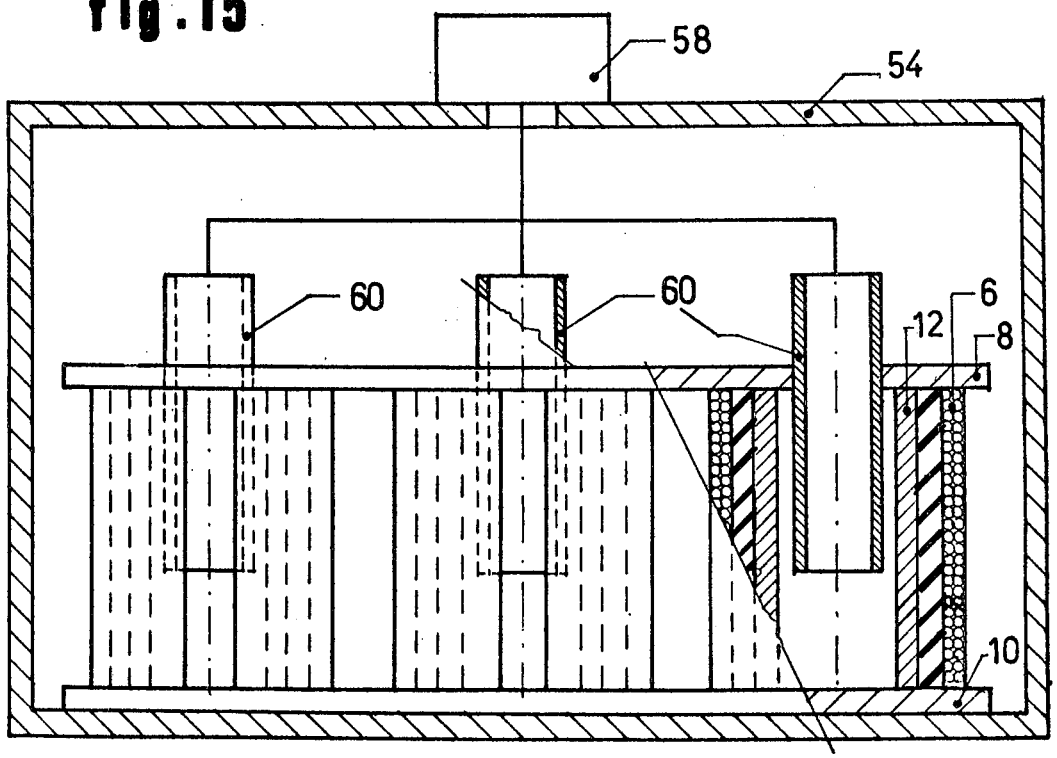
FIG. 16 illustrates partly in cross-section a device having displaceable inner core elements.

Instead or in addition to the described opening-regulating systems, any interior core element 60 (see FIG. 16) can be adapted to be reciprocally displaced, by means of an electromagnetic drive, inside slotted tubular element 12 to provide still a greater range and variety for the regulation of such devices so as to provide a greater number of operating modes and greater flexibility.

With the starting and controlling device, according to the present invention, it is possible to start not only induction motors having a wound rotor, but also motors with cage rotors. In the latter type motors, the controlling device will be coupled alongside the stator of the motor and the starting thereof will be effected by short-circuiting the starting device or by changing the magnetic parameters of the device as described herein.

It will be evident to those skilled in the art that the invention is not limited to the details of the foregoing illustrative embodiments and that the present invention may be embodied in other specific forms without departing from the spirit or essential attributes thereof, and it is therefore desired that the present embodiments be considered in all respects as illustrative and not restrictive, reference being made to the appended claims; rather than to the foregoing description, in which it is intended to claim all modifications coming within the scope and spirit of the invention.

What is claimed is:

1. A device for controlling an A.C. motor having an electromagnetic field inducing coil witn an axis wound around a conductive element wherein said element comprises at least one inwardly directed opening bound by surface areas of said element and having a gap $a$ between said surface areas defined by the formula $a \geq \delta$, wherein $\delta$ is the wave penetrating depth of an instantaneous operating frequency of induced electromagnetic energy, said gap defining an open space within the confines of said element and further characterized in that said coil is wound so as to surround said open space and said element for inducing flux along walls of said element, whereby the exposed surface area of said element is in effect increased for increasing the absorption of the induced energy.

2. The device as claimed in claim 1 wherein said element is an assembly composed of a plurality of element bodies.

3. The device as claimed in claim 1 wherein said element comprises a plurality of projections extending beyond the periphery of said wound coil wherein said projections define additional gaps therebetween.

4. The device as claimed in claim 1 wherein said element is a substantially hollow tubular element having at least one throughgoing slot extending along at least a portion of the surface of said element.

5. The device as claimed in claim 4 wherein said tubular element is provided on its inner surface with at least one inwardly extending projection.

6. The device as claimed in claim 4 wherein said tubular element is provided on its outer surface with at least one outwardly extending projection.

7. The device as claimed in claim 4 wherein said slot is characterized by a constant width along its entire length.

8. The device as claimed in claim 4 wherein said slot is characterized by a variable width along its length.

9. The device as claimed in claim 4 wherein said slot is provided with means adapted to vary the shape of the slot during the operating of the device.

10. The device as claimed in claim 4 wherein said slot is provided with a longitudinal plate-like element having substantially the shape of the slot and rotatably mounted in the slot so as to allow the blocking of at least part of the slot when said element is swung about its axis.

11. The device as claimed in claim 4 further characterized by an additional core element coaxially situated with said hollow tubular element.

12. The device as claimed in claim 11 wherein said tubular element is provided with a tongue extending along at least part of its exterior surface and projecting across the space between the core element and the tubular hollow element and wherein said core element and tongue are adapted to be rotated about the core's axis whereby the effective opening of the slot is controlled.

13. The device as claimed in claim 4 wherein said tubular element comprises at least two concentrically disposed slotted tubular elements coupled together along their slotted sections to form labyringh-like passages.

14. The device as claimed in claim 2 wherein said element is composed of a plurality of interconnected spaced-apart plate-members.

15. The device as claimed in claim 2 wherein said element is composed of a finned element having a coil wound around said element inbetween at least some of said fins so as to surround only a portion of the surface of said fins.

16. The device as claimed in claim 11 wherein said core element is adapted to be reciprocally displaced inside said tubular element from a first position wherein it is fully inserted therein to a second position wherein it is fully retracted therefrom.

17. The device as claimed in claim 11 wherein said core element is a hollow tubular element and is provided with a throughgoing slot along at least a part of its surface.

18. The device as claimed in claim 4 wherein a longitudinally extending ferromagnetic insert is adapted to be displaced inside said tubular element from a first fully-inserted position to a second fully-retracted position.

19. A device as claimed in claim 1 comprising at least two of said devices arranged in circuit for starting a multi-phase A.C. motor.

20. The device according to claim 16 wherein the displacement of said tubular core and longitudinal insert is accomplished by means of an electromagnetic drive.

21. The device as claimed in claim 4 wherein said slot is provided with means adapted to vary the width of the slot during operation of the device.

22. The device as claimed in claim 4 wherein said slot is provided with means adapted to vary the width and shape of the slot during operation of the device.

23. The device as claimed in claim 1 wherein said coil is wound with its axis parallel to said element and open space for inducing flux along walls of said element parallel to said opening.

* * * * *